United States Patent
Gong et al.

(10) Patent No.: US 10,050,701 B2
(45) Date of Patent: Aug. 14, 2018

(54) APPARATUS AND METHOD FOR REORGANIZING RESOURCES OF OPTICAL FIBER CABINET AND OPTICAL FIBER CABINET

(71) Applicant: HUAWEI TECHNOLOGIES CO., LTD., Shenzhen (CN)

(72) Inventors: Jianmin Gong, Santa Clara, CA (US); Jun Huang, Gurgaon (IN); Jun Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/138,814

(22) Filed: Apr. 26, 2016

(65) Prior Publication Data

US 2016/0241331 A1   Aug. 18, 2016

Related U.S. Application Data (63) Continuation of application No. PCT/CN2015/076328, filed on Apr. 10, 2015.

(30) Foreign Application Priority Data

Sep. 23, 2014   (CN) .......................... 2014 1 0490620

(51) Int. Cl.
*H04B 10/073*   (2013.01)
*H04Q 11/00*   (2006.01)
(Continued)

(52) U.S. Cl.
CPC ......... *H04B 10/073* (2013.01); *H04B 10/077* (2013.01); *H04B 10/27* (2013.01);
(Continued)

(58) Field of Classification Search
CPC ............... H04Q 1/136; H04Q 11/0067; H04Q 2011/0086; H04Q 2011/0083;
(Continued)

(56) References Cited

U.S. PATENT DOCUMENTS 8,059,931 B2   11/2011   Russell
2007/0238343 A1*   10/2007   Velleca ................ H01R 9/2475
439/188
(Continued)

FOREIGN PATENT DOCUMENTS

CN   1236234 A   11/1999
CN   200941124 Y   8/2007
(Continued)

OTHER PUBLICATIONS

International Search Report dated Jun. 26, 2015 in corresponding International Patent Application No. PCT/CN2015/076328.
(Continued)

*Primary Examiner* — Shi K Li
*Assistant Examiner* — Mina Shalaby
(74) *Attorney, Agent, or Firm* — Staas & Halsey LLP (57) ABSTRACT

The present invention provides an apparatus including: a macrobending injected-light modulation and control module, configured to modulate an injected optical signal according to a port identifier of each first port and inject the injected optical signal to an optical fiber connected to the first port; a macrobending signal detection module, configured to receive a received optical signal at a second port of an optical transmission path; a phase-locked detection module, electrically connected to the macrobending injected-light modulation and control module and the macrobending signal detection module, and configured to: when an injected optical signal that is injected by the macrobending injected-light modulation and control module to an optical fiber is
(Continued)

consistent with a received optical signal that is acquired by the macrobending signal detection module, acquire and output port identifiers of a first port and a second port.

14 Claims, 6 Drawing Sheets

(51) Int. Cl.
    *H04B 10/27*     (2013.01)
    *H04B 10/077*     (2013.01)
    *H04Q 1/02*     (2006.01)
    *G02B 6/42*     (2006.01)

(52) U.S. Cl.
    CPC ......... *H04Q 1/136* (2013.01); *H04Q 11/0067* (2013.01); *G02B 6/4289* (2013.01); *H04Q 2011/0083* (2013.01); *H04Q 2011/0086* (2013.01)

(58) Field of Classification Search
    CPC .... H04B 10/073; H04B 10/27; H04B 10/077; G02B 6/4289
    See application file for complete search history.

(56) References Cited

U.S. PATENT DOCUMENTS

| 2010/0008482 | A1* | 1/2010 | Tucker | H04Q 1/136 |
| | | | | 379/93.05 |
| 2012/0063767 | A1 | 3/2012 | Wen et al. | |
| 2014/0079400 | A1* | 3/2014 | Sengupta | H04J 14/02 |
| | | | | 398/79 |
| 2014/0219656 | A1 | 8/2014 | Lawson et al. | |

FOREIGN PATENT DOCUMENTS

| CN | 101995612 A | 3/2011 |
| CN | 103368643 A | 10/2013 |
| CN | 103368778 A | 10/2013 |
| CN | 104049309 A | 9/2014 |

OTHER PUBLICATIONS

Chinese Office Action dated Jun. 20, 2017 in corresponding Chinese Patent Application No. 201410490620.8.

International Search Report dated Jun. 29, 2015, in corresponding International Application No. PCT/CN2015/076328.

\* cited by examiner

APPARATUS AND METHOD FOR REORGANIZING RESOURCES OF OPTICAL FIBER CABINET AND OPTICAL FIBER CABINET

CROSS-REFERENCE

This application is a continuation of International Application No. PCT/CN2015/076328, filed on Apr. 10, 2015, which claims priority to Chinese Patent Application No. 201410490620.8, filed on Sep. 23, 2014, both of which are hereby incorporated by reference in their entireties.

TECHNICAL FIELD

The present invention relates to the field of fiber optic communications, and in particular, to an apparatus and a method for reorganizing resources of an optical fiber cabinet and an optical fiber cabinet.

BACKGROUND

In recent years, with the rapid development of optical network technologies, an optical distribution network (ODN) has been applied more and more widely. Particularly, the demands for a large-scale, highly reliable, and extensible optical distribution module (ODM) are increasingly prominent in the communications industry.

Specifically, an optical distribution module includes multiple optical fibers, and has multiple optical input ports and optical output ports. Generally, an equipment room is equipped with multiple optical distribution modules, and an optical channel is established through jumper connection between the multiple optical distribution modules. That is, an optical channel is established between different modules by using an optical fiber. In an ODN and ODM development process, how to rapidly find a connection correspondence between ports of an online device and achieve resource reorganization becomes a great obstacle to ODN development.

SUMMARY

An apparatus and a method for reorganizing resources of an optical fiber cabinet and an optical fiber cabinet are provided, to rapidly find a matching correspondence between ports in an optical fiber cabinet.

According to a first aspect, an apparatus for reorganizing resources of an optical fiber cabinet is provided, configured to search for ports located at two ends of a same optical transmission path, where the optical fiber cabinet includes at least two optical transmission paths, each optical transmission path is provided with a first port and a second port, and the apparatus for reorganizing resources of an optical fiber cabinet includes:

a macrobending injected-light modulation and control module, configured to modulate an injected optical signal according to a port identifier of each first port, and inject the injected optical signal to an optical fiber connected to the first port;

a macrobending signal detection module, configured to receive a received optical signal at a second port of an optical transmission path;

a phase-locked detection module, electrically connected to the macrobending injected-light modulation and control module and the macrobending signal detection module, and configured to: when an injected optical signal that is injected by the macrobending injected-light modulation and control module to an optical fiber is consistent with a received optical signal that is acquired by the macrobending signal detection module, acquire and output port identifiers of a first port and a second port; and a port matching module, configured to receive the port identifiers of the first port and the second port that are output by the phase-locked detection module, and establish a matching correspondence between the first port and the second port according to the port identifiers of the first port and the second port.

In a first possible implementation manner of the first aspect, the optical fiber forms macrobendings that correspond to the first port and the second port respectively, and the macrobendings are used to inject testing light to the optical fiber or output testing light from the optical fiber.

In a second possible implementation manner of the first aspect, that the injected optical signal is consistent with the received optical signal means that the injected optical signal and the received optical signal have a same frequency and a same phase.

In a third possible implementation manner of the first aspect, the port matching module is further configured to display the matching correspondence.

In a fourth possible implementation manner of the first aspect, the port matching module is further configured to send the matching correspondence to a back-end platform.

In a fifth possible implementation manner of the first aspect, the port identifier of the first port is used to indicate a physical location and/or port attribute of the first port.

In a sixth possible implementation manner of the first aspect, the port identifier of the second port is used to indicate a physical location and/or port attribute of the second port.

According to a second aspect, an apparatus for reorganizing resources of an optical fiber cabinet is provided, configured to search for ports located at two ends of a same optical transmission path, where the optical fiber cabinet includes at least two optical transmission paths, each optical transmission path is provided with a first port and a second port, and the apparatus for reorganizing resources of an optical fiber cabinet includes:

a macrobending injected-light modulation and control module, configured to modulate an injected optical signal according to a port identifier of a first port, and inject the injected optical signal to an optical fiber connected to the first port;

multiple macrobending signal detection modules, separately configured to receive received optical signals at second ports of the multiple optical transmission paths;

a phase-locked detection module, electrically connected to the macrobending injected-light modulation and control module and the multiple macrobending signal detection modules, and configured to receive the received optical signals at the second ports of the multiple optical transmission paths and the injected optical signal, acquire and output a port identifier of a second port that corresponds to a received optical signal consistent with the injected optical signal, and acquire and output a port identifier of the first port; and a port matching module, configured to receive the port identifiers of the first port and the second port that are output by the phase-locked detection module, and establish a matching correspondence between the first port and the second port according to the port identifiers of the first port and the second port.

In a first possible implementation manner of the second aspect, the optical fiber forms macrobendings that correspond to the first port and the second port respectively, and the macrobendings are used to inject testing light to the optical fiber or output testing light from the optical fiber.

In a second possible implementation manner of the second aspect, that the injected optical signal is consistent with the received optical signal means that the injected optical signal and the received optical signal have a same frequency and a same phase.

In a third possible implementation manner of the second aspect, the port matching module is further configured to display the matching correspondence.

In a fourth possible implementation manner of the second aspect, the port matching module is further configured to send the matching correspondence to a back-end platform.

In a fifth possible implementation manner of the second aspect, the port identifier of the first port is used to indicate a physical location and/or port attribute of the first port; and the port identifier of the second port is used to indicate a physical location and/or port attribute of the second port.

According to a third aspect, an optical fiber cabinet is provided, using the apparatus for reorganizing resources of an optical fiber cabinet in any one of the foregoing implementation manners.

According to a fourth aspect, a method for reorganizing resources of an optical fiber cabinet is provided, including:

modulating an injected optical signal and injecting the injected optical signal to a first port of an optical transmission path;

acquiring a received optical signal at a second port of the optical transmission path, and when the injected optical signal is consistent with the received optical signal, outputting detection confirmation information; and matching the first port with the second port according to the detection confirmation information.

In a first possible implementation manner of the fourth aspect, during the acquiring a received optical signal at a second port of the optical transmission path, and when the injected optical signal is consistent with the received optical signal, outputting detection confirmation information, the method further includes the following steps:

detecting a second port, and receiving a received optical signal output by the second port; and determining whether the injected optical signal is consistent with the received optical signal, and if yes, outputting the detection confirmation information, or if not, repeating the previous step.

In a second possible implementation manner of the fourth aspect, during the acquiring a received optical signal at a second port of the optical transmission path, and when the injected optical signal is consistent with the received optical signal, outputting detection confirmation information, the method includes:

detecting all second ports, and receiving received optical signals output by all the second ports; and determining a second port that outputs a received optical signal consistent with the injected optical signal, and outputting detection confirmation information that corresponds to the second port.

According to a fifth aspect, a method for reorganizing resources of an optical fiber cabinet is provided, including: modulating multiple unique injected optical signals, and injecting an injected optical signal to a first port of each optical transmission path among multiple optical transmission paths;

acquiring received optical signals at second ports of the multiple optical transmission paths, and when the injected optical signals are consistent with the received optical signals, outputting detection confirmation information; and matching the first ports with the second ports according to the detection confirmation information.

In a first possible implementation manner of the fifth aspect, during the acquiring received optical signals at second ports of the multiple optical transmission paths, and when the injected optical signals are consistent with the received optical signals, outputting detection confirmation information, the method further includes the following steps:

detecting multiple second ports, and receiving received optical signals output by the multiple second ports; and matching an injected optical signal with a received optical signal that are consistent, and outputting a piece of detection confirmation information for each pair of an injected optical signal and a received optical signal that are consistent.

According to the apparatus and method for reorganizing resources of an optical fiber cabinet of the present invention, reorganization of optical fibers is implemented based on optical signals and a macrobending signal detection module, thereby achieving rapid matching and reorganization with high matching efficiency.

BRIEF DESCRIPTION OF DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
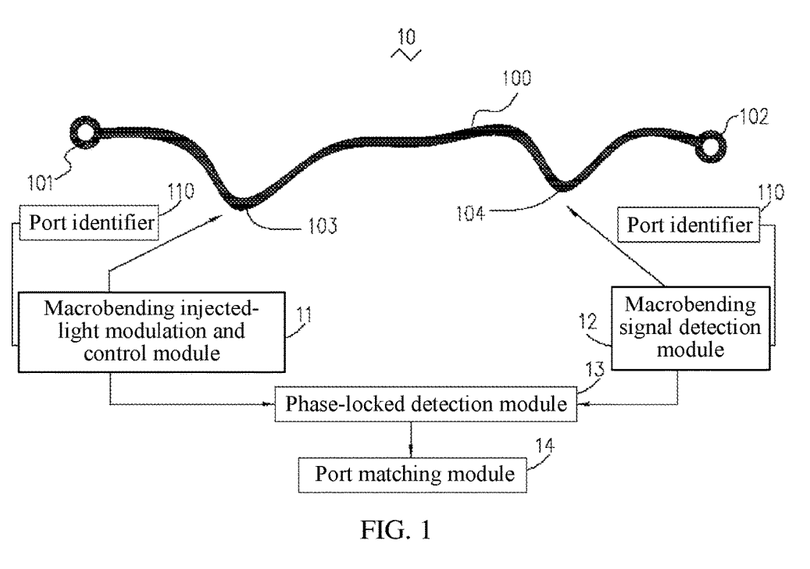
FIG. 1 is a schematic diagram of a principle of an apparatus for reorganizing resources of an optical fiber cabinet according to a first exemplary implementation manner.
Figure 2:
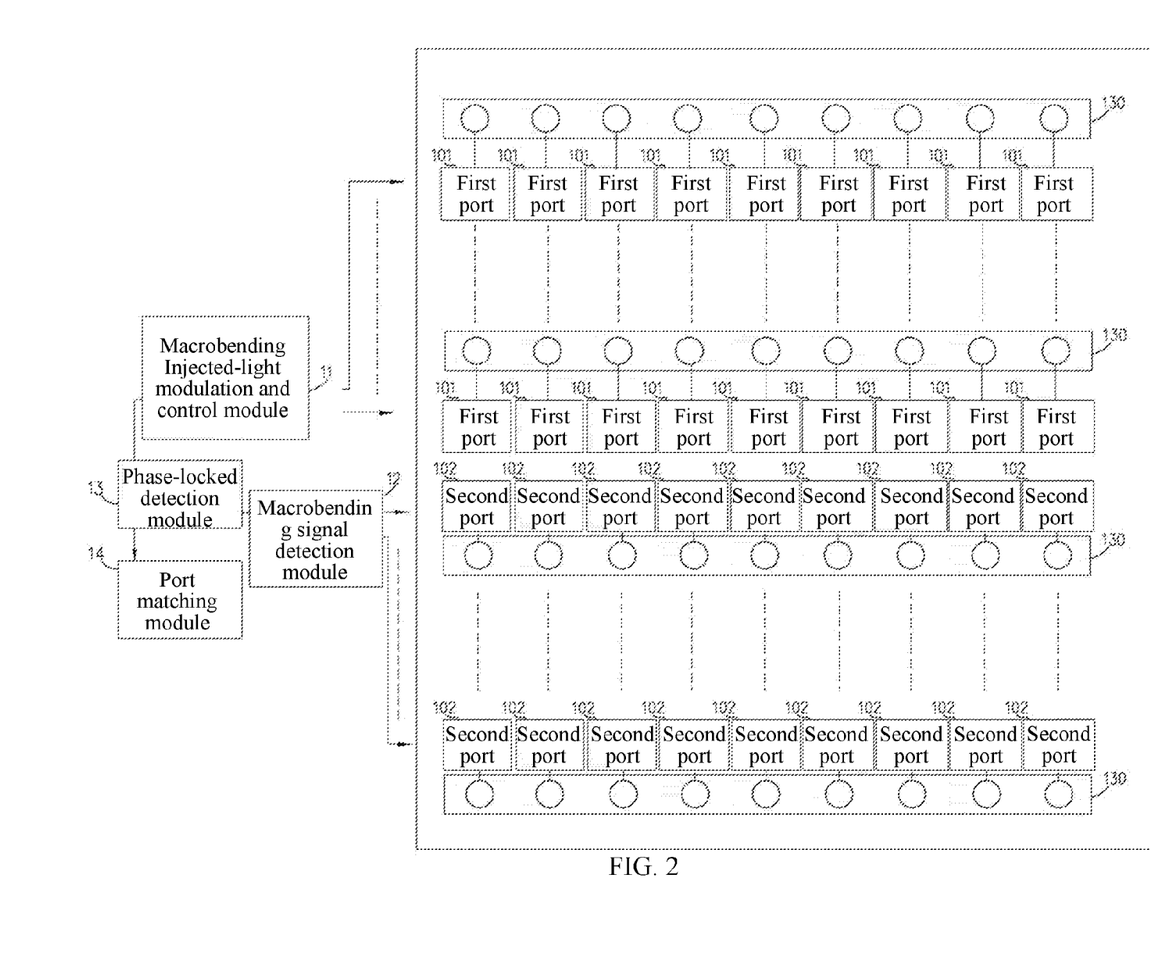
FIG. 2 is a schematic diagram of disposition of the apparatus for reorganizing resources of an optical fiber cabinet according to the first exemplary implementation manner.

Referring to FIG. 1, a first exemplary implementation manner of the present invention provides an apparatus 10 for reorganizing resources of an optical fiber cabinet, configured to determine a matching correspondence between ports in an optical fiber cabinet 120. In this implementation manner, the optical fiber cabinet 120 is provided with a plurality of splicing trays 130 inside, and each splicing tray 130 has a plurality of connector ports. Every two of connector ports of the plurality of splicing trays 130 are connected. That is, at least two connector ports are located on a same optical transmission path. In other words, the optical fiber cabinet 120 includes at least two optical transmission paths, and each optical transmission path is provided with a port on each of two ends. In this implementation manner, an optical transmission path refers to an optical fiber 100 connected between two ports, and the optical fiber 100 is provided with a first port 101 and a second port 102.

The apparatus 10 for reorganizing resources of an optical fiber cabinet includes a macrobending injected-light modulation and control module 11, a macrobending signal detection module 12, a phase-locked detection module 13 and a port matching module 14. The macrobending injected-light modulation and control module 11 is configured to modulate an injected optical signal according to a port identifier 110 of a first port 101, and inject the injected optical signal to an optical fiber 100 connected to the first port 101. The macrobending signal detection module 12 is configured to receive a received optical signal at a second port 102 of an optical transmission path. The phase-locked detection module 13 is electrically connected to the macrobending injected-light modulation and control module 11 and the macrobending signal detection module 12, and configured to: when an injected optical signal that is injected by the macrobending injected-light modulation and control module 11 to an optical fiber 100 is consistent with a received optical signal that is acquired by the macrobending signal detection module 12, acquire and output port identifiers 110 of the first port 101 and the second port 102. The port matching module 14 receives the port identifiers 110 of the first port 101 and the second port 102 that are output by the phase-locked detection module 13, and establish a matching correspondence between the first port 101 and the second port 102 according to the port identifiers 110 of the first port 101 and the second port 102.

As shown in FIG. 1, the optical fiber 100 forms a macrobending 103 and a macrobending 104 that correspond to the first port 101 and the second port 102 respectively, and the macrobending 103 and the macrobending 104 are used to inject testing light to the optical fiber 100 or output testing light from the optical fiber 100. In this embodiment, bending dimensions of the macrobendings 103 and 104 formed on the optical fiber 100 have no impact on effect of the optical fiber. The macrobending injected-light modulation and control module 11 injects an optical signal to the macrobending 103 located at the first port 101. The macrobending signal detection module 12 receives a received optical signal leaking out of the macrobending 104 located at the second port 102.

That the injected optical signal is consistent with the received optical signal means that the injected optical signal and the received optical signal have a same frequency and a same phase.

The port matching module 14 is further configured to display the matching correspondence and send the matching correspondence to a back-end platform (not shown in the figure). The port identifier 110 of the first port 101 is used to indicate a physical location and/or port attribute of the first port 101. The port identifier 110 of the second port 102 is used to indicate a physical location and/or port attribute of the second port 102.

According to the apparatus 10 for reorganizing resources of an optical fiber cabinet in this embodiment, an optical signal is modulated based on a port identifier, and is injected and received by using macrobendings. In addition, rapid matching and reorganization can be achieved with high matching efficiency no matter whether an optical fiber is online or not.

Figure 3:
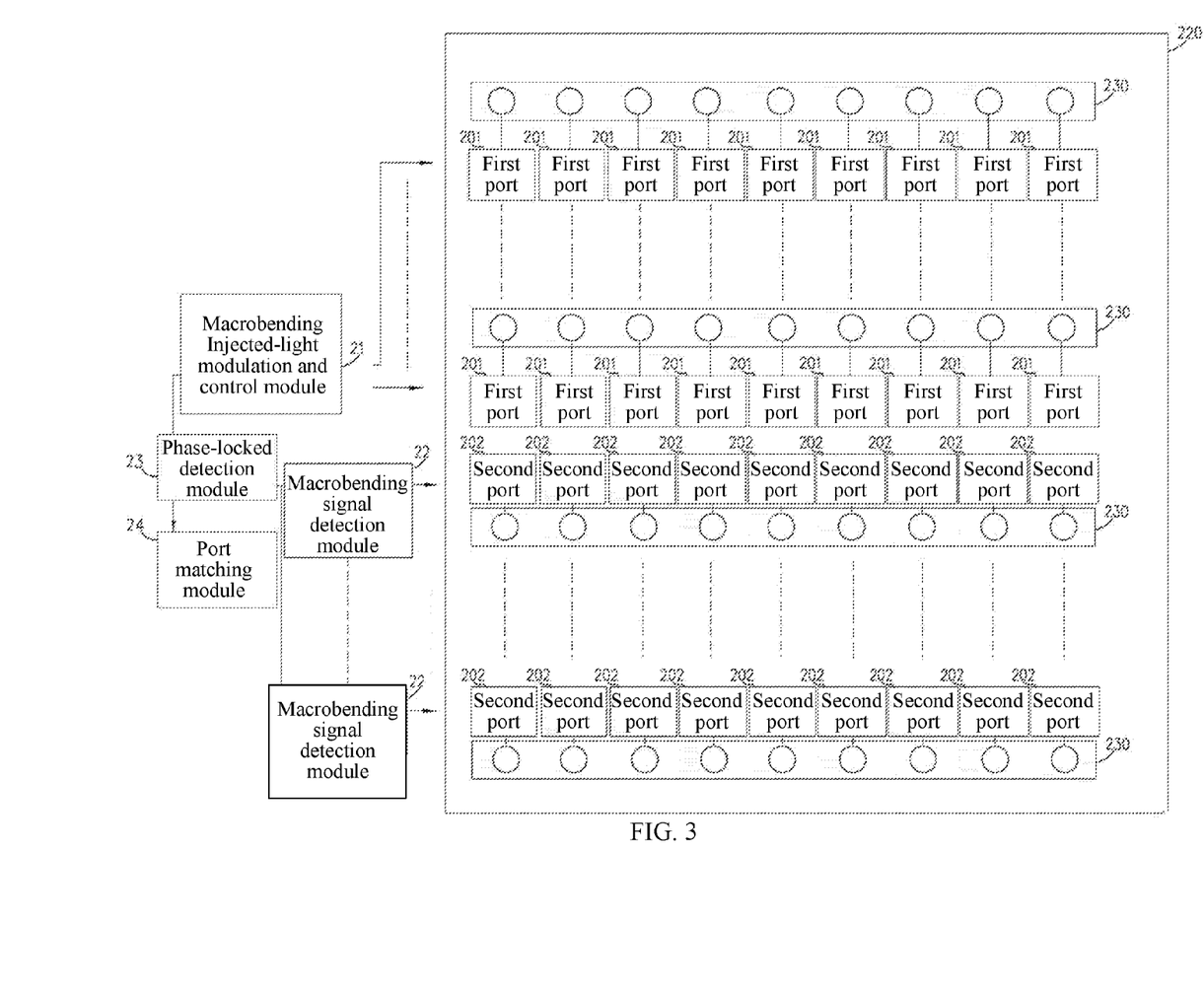
FIG. 3 is a schematic diagram of disposition of an apparatus for reorganizing resources of an optical fiber cabinet according to a second exemplary implementation manner.

A second exemplary embodiment of the present invention provides an apparatus 20 for reorganizing resources of an optical fiber cabinet, applied to an optical fiber cabinet, and configured to search for two ports located at two ends, inside the optical fiber cabinet, of a same optical transmission path. In this implementation manner, the optical fiber cabinet 220 is provided with a plurality of splicing trays 230 inside, and each splicing tray 230 has a plurality of connector ports. Every two of connector ports of the plurality of splicing trays 230 are connected. That is, at least two connector ports are located on a same optical transmission path. In other words, the optical fiber cabinet 220 includes at least two optical transmission paths, and each optical transmission path is provided with a first port 201 and a second port 202. The apparatus 20 for reorganizing resources of an optical fiber cabinet in this embodiment is substantially the same as that in the first exemplary embodiment. The apparatus 20 for reorganizing resources of an optical fiber cabinet includes one or more macrobending injected-light modulation and control modules 21, multiple macrobending signal detection modules 22, a phase-locked detection module 23 and a port matching module 24.

The macrobending injected-light modulation and control module 21 is configured to modulate an injected optical signal according to a port identifier 110 of a first port 201, and inject, at a macrobending, the injected optical signal to an optical fiber 100 connected to the first port 201. In this embodiment, there are one or more disposed macrobending injected-light modulation and control modules 21. The multiple macrobending injected-light modulation and control modules 21 may be simultaneously connected to different optical transmission paths, and separately send received optical signals to the optical transmission paths, so as to improve reorganization efficiency.

The multiple macrobending signal detection modules 22 are separately configured to receive received optical signals at second ports 202 of the multiple optical transmission paths.

The phase-locked detection module 23 is electrically connected to the macrobending injected-light modulation and control module 21 and the multiple macrobending signal detection modules 22, and configured to receive the received optical signals at the second ports 202 of the multiple optical transmission paths and the injected optical signal, acquire and output a port identifier 110 of a second port 202 that corresponds to a received optical signal consistent with the injected optical signal, and acquire and output a port identifier 110 of the first port 201. In this embodiment, the phase-locked detection module 23 is a multi-channel phase-locked detection module 23, configured to simultaneously connect to the multiple macrobending signal detection modules 22, acquire a received optical signal, and determine a macrobending signal detection module 22 that corresponds to a channel receiving the received optical signal. When the apparatus 20 for reorganizing resources of an optical fiber cabinet in this embodiment includes multiple macrobending injected-light modulation and control modules 21, the phase-locked detection module 23 finds, for each injected optical signal, a received optical signal that is consistent with each injected optical signal, and separately outputs port identifiers of ports that correspond to the received optical signal and injected optical signal that are consistent.

The port matching module 24 is configured to receive the port identifiers 110 of the first port 201 and the second port 202 that are output by the phase-locked detection module 23, and establish a matching correspondence between the first port 201 and the second port 202 according to the port identifiers 110 of the first port 201 and the second port 202.

In this embodiment, according to the apparatus 20 for reorganizing resources of an optical fiber cabinet, an optical signal is modulated based on a port identifier, and is injected and received by using macrobendings. In addition, rapid matching and reorganization can be achieved with high matching efficiency no matter whether an optical fiber is online or not. Besides, multiple macrobending signal detection modules 22 are disposed, so that received optical signals at multiple second ports 202 can be simultaneously received for detection, thereby improving receiving and detection efficiency.

The present invention further provides an optical fiber cabinet, using the foregoing apparatus 10 or 20 for reorganizing resources of an optical fiber cabinet.

Figure 4:
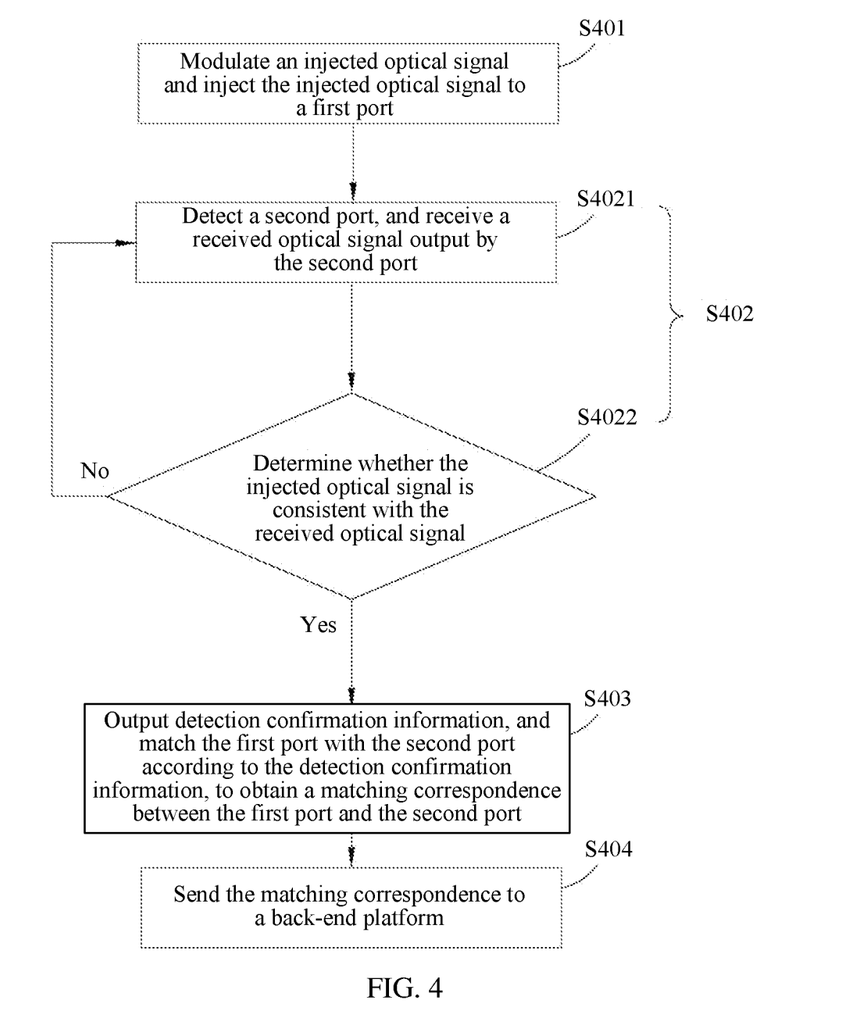
FIG. 4 is a flowchart of a method for reorganizing resources of an optical fiber cabinet according to a third exemplary implementation manner.

Referring to FIG. 4, a third exemplary embodiment of the present invention provides a method for reorganizing resources of an optical fiber cabinet, including the following steps:

Step S401: A macrobending injected-light modulation and control module modulates an injected optical signal, and injects the injected optical signal to a first port of an optical transmission path.

Step S402: A phase-locked detection module acquires a received optical signal at a second port of the optical transmission path, and when the injected optical signal is consistent with the received optical signal, outputs detection confirmation information.

Step S402 further includes the following steps:

Step S4021: A macrobending signal detection module detects a second port, and receives a received optical signal output by the second port.

Step S4022: The phase-locked detection module determines whether the injected optical signal is consistent with the received optical signal, and if yes, outputs the detection confirmation information, or if not, the previous step is repeated.

Step S403: A port matching module matches the first port with the second port according to the detection confirmation information, to obtain a matching correspondence between the first port and the second port.

Step S404: The port matching module sends the matching correspondence to a back-end platform.

According to the method for reorganizing resources of an optical fiber cabinet in this embodiment, an optical signal is modulated based on a port identifier, and is injected and received by using macrobendings. In addition, rapid matching and reorganization can be achieved with high matching efficiency no matter whether an optical fiber is online or not.

Figure 5:
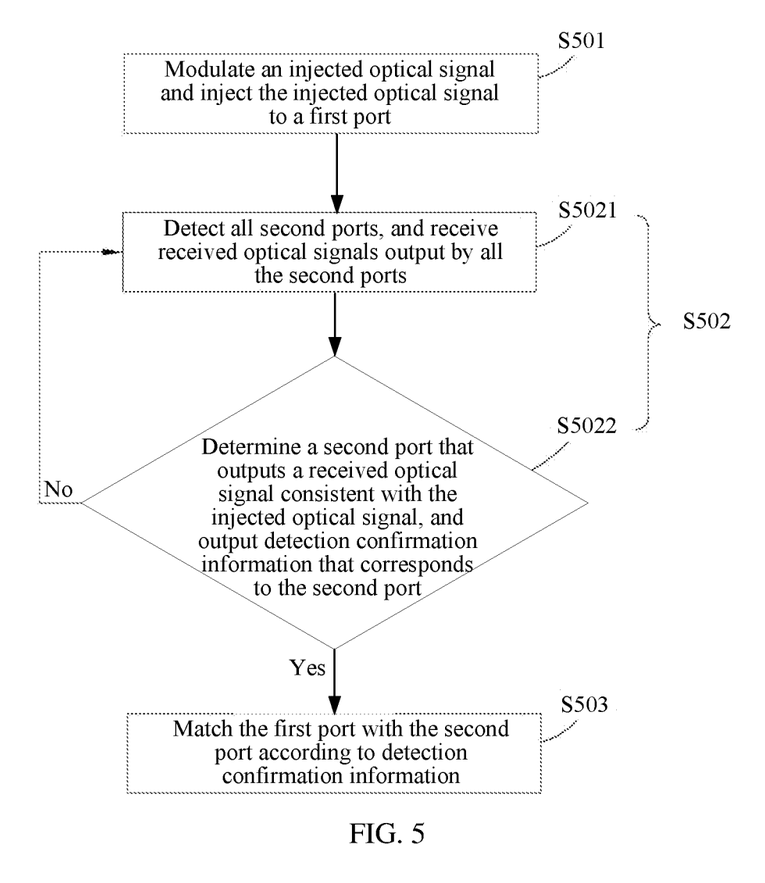
FIG. 5 is a flowchart of a method for reorganizing resources of an optical fiber cabinet according to a fourth exemplary implementation manner.

Referring to FIG. 5, a fourth exemplary embodiment of the present invention provides a method for reorganizing resources of an optical fiber cabinet, including the following steps:

Step S501: A macrobending injected-light modulation and control module modulates an injected optical signal, and injects the injected optical signal to a first port of an optical transmission path.

Step S502: A phase-locked detection module acquires a received optical signal at a second port of the optical transmission path, and when the injected optical signal is consistent with the received optical signal, outputs detection confirmation information.

Step S502 further includes the following steps:

Step S5021: Multiple macrobending signal detection modules simultaneously detect all second ports, and receive received optical signals output by all the second port.

Step S5022: The phase-locked detection module determines a second port that outputs a received optical signal consistent with the injected optical signal, and outputs detection confirmation information that corresponds to the second port.

Step S503: A port matching module matches the first port with the second port according to the detection confirmation information.

According to the method for reorganizing resources of an optical fiber cabinet in this embodiment, an optical signal is modulated based on a port identifier, and is injected and received by using macrobendings. In addition, rapid matching and reorganization can be achieved with high matching efficiency no matter whether an optical fiber is online or not. Received optical signals at multiple second ports are simultaneously received for detection, thereby improving receiving and detection efficiency.

Figure 6:
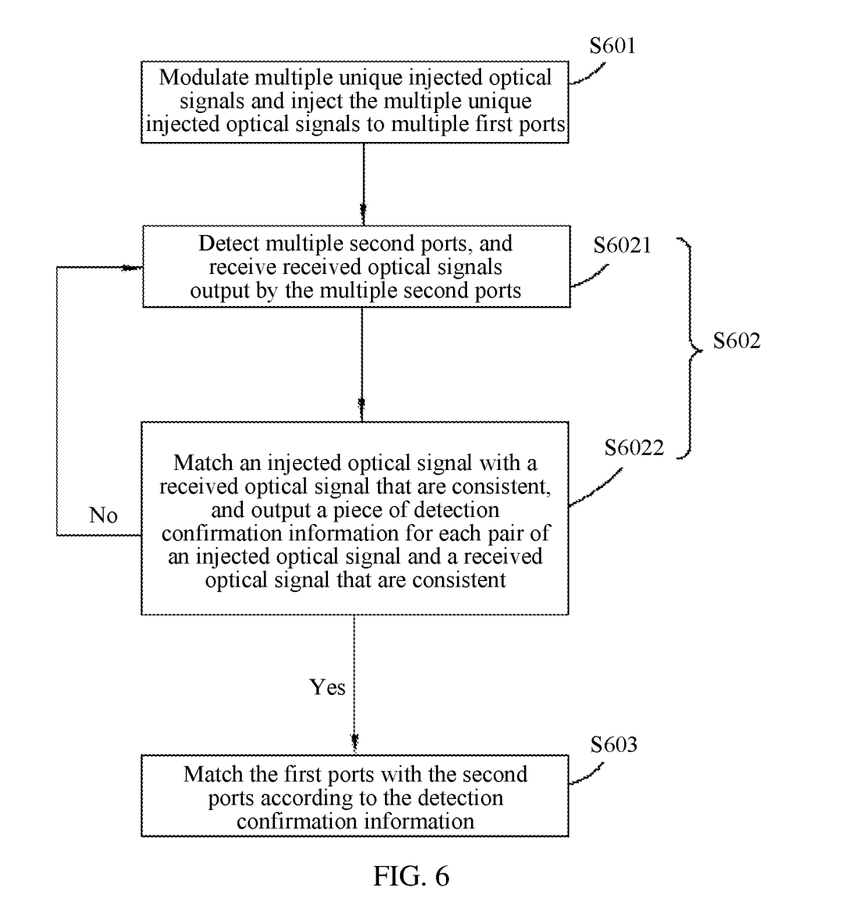
FIG. 6 is a flowchart of a method for reorganizing resources of an optical fiber cabinet according to a fifth exemplary implementation manner.

Referring to FIG. 6, a fifth exemplary embodiment of the present invention provides a method for reorganizing resources of an optical fiber cabinet, including the following steps:

Step S601: Multiple macrobending injected-light modulation and control modules modulate multiple unique injected optical signals, and inject an injected optical signal to a first port of each optical transmission path among multiple optical transmission paths.

Step S602: A phase-locked detection module acquires received optical signals at second ports of the multiple optical transmission paths, and when the injected optical signals are consistent with the received optical signals, outputs detection confirmation information.

Step S602 further includes the following steps:

Step S6021: Multiple macrobending signal detection modules separately detect multiple second ports, and receive received optical signals output by the multiple second ports.

Step S6022: The phase-locked detection module matches an injected optical signal with a received optical signal that are consistent, and outputs a piece of detection confirmation information for each pair of an injected optical signal and a received optical signal that are consistent.

Step S603: A port matching module matches the first port with the second port according to the detection confirmation information.

According to the method for reorganizing resources of an optical fiber cabinet in this embodiment, an optical signal is modulated based on a port identifier, and is injected and received by using macrobendings. In addition, rapid matching and reorganization can be achieved with high matching efficiency no matter whether an optical fiber is online or not. Besides, an injected optical signal is injected to a first port of each optical transmission path among multiple optical transmission paths, so that matching between multiple ports can be completed during one-time detection, thereby improving receiving and detection efficiency.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. An method for reorganizing resources of an optical fiber cabinet and configured to search for ports located at two ends of a same optical transmission path, wherein the optical fiber cabinet comprises at least two optical transmission paths, each optical transmission path is provided with a first port and a second port, and the method for reorganizing resources of an optical fiber cabinet comprises:

modulating an injected optical signal according to a port identifier of each first port, and injecting the injected optical signal to an optical fiber connected to the first port;

receiving a received optical signal at a second port of an optical transmission path;

when an injected optical signal that is injected to an optical fiber is consistent with a received optical signal, acquiring and outputting port identifiers of a first port and a second port; and receiving the port identifiers of the first port and the second port, and establishing a matching correspondence between the first port and the second port according to the port identifiers of the first port and the second port, wherein the optical fiber forms macrobendings that correspond to the first port and the second port respectively, and the macrobendings are used to inject testing light to the optical fiber or output testing light from the optical fiber.

2. The method according to claim 1, wherein when the injected optical signal is consistent with the received optical signal then the injected optical signal and the received optical signal have a same frequency and a same phase.

3. The method according to claim 1, wherein the method further comprises displaying the matching correspondence.

4. The method according to claim 1, wherein the method further comprises sending the matching correspondence to a back-end platform.

5. The method according to claim 1, wherein the port identifier of the first port is used to indicate a physical location and/or port attribute of the first port.

6. The method according to claim 1, wherein the port identifier of the second port is used to indicate a physical location and/or port attribute of the second port.

7. A method for reorganizing resources of an optical fiber cabinet and configured to search for ports located at two ends of a same optical transmission path, wherein the optical fiber cabinet comprises multiple optical transmission paths, each optical transmission path is provided with a first port and a second port, and the method for reorganizing resources of an optical fiber cabinet comprises:

modulating an injected optical signal according to a port identifier of a first port, and injecting the injected optical signal to an optical fiber connected to the first port;

receiving received optical signals at second ports of the multiple optical transmission paths;

receiving the received optical signals at the second ports of the multiple optical transmission paths and the injected optical signal, acquiring and outputting a port identifier of a second port that corresponds to a received optical signal consistent with the injected optical signal, and acquiring and output a port identifier of the first port; and receiving the port identifiers of the first port and the second port, and establishing a matching correspondence between the first port and the second port according to the port identifiers of the first port and the second port, wherein the optical fiber forms macrobendings that correspond to the first port and the second port respectively, and the macrobendings are used to inject testing light to the optical fiber or output testing light from the optical fiber.

8. The method according to claim 7, wherein that the injected optical signal is consistent with the received optical signal means that the injected optical signal and the received optical signal have a same frequency and a same phase.

9. The method according to claim 7, wherein the method further comprises displaying the matching correspondence.

10. The method according to claim 7, wherein the method further comprises sending the matching correspondence to a back-end platform.

11. The method according to claim 7, wherein the port identifier of the first port is used to indicate a physical location and/or port attribute of the first port; and the port identifier of the second port is used to indicate a physical location and/or port attribute of the second port.

12. A method for reorganizing resources of an optical fiber cabinet, comprising:

modulating an injected optical signal and injecting the injected optical signal to an optical fiber connected to a first port of an optical transmission path;

acquiring a received optical signal at a second port of the optical transmission path, and when the injected optical signal is consistent with the received optical signal, outputting detection confirmation information; and matching the first port with the second port according to the detection confirmation information, wherein the optical fiber forms macrobendings that correspond to the first port and the second port respectively, and the macrobendings are used to inject testing light to the optical fiber or output testing light from the optical fiber.

13. The method according to claim 12, wherein during the acquiring a received optical signal at a second port of the optical transmission path, and when the injected optical signal is consistent with the received optical signal, outputting detection confirmation information, the method further comprises:

detecting a second port, and receiving a received optical signal output by the second port; and determining whether the injected optical signal is consistent with the received optical signal, and if yes, outputting the detection confirmation information, or if not, repeating the previous step.

14. The method according to claim 12, during the acquiring a received optical signal at a second port of the optical transmission path, and when the injected optical signal is consistent with the received optical signal, outputting detection confirmation information, the method comprises:

detecting all second ports, and receiving received optical signals output by all the second ports; and determining a second port that outputs a received optical signal consistent with the injected optical signal, and outputting detection confirmation information that corresponds to the second port.

\* \* \* \* \*